United States Patent
Chandrasekaran et al.

(10) Patent No.: US 9,418,389 B2
(45) Date of Patent: Aug. 16, 2016

(54) SOCIAL INTELLIGENCE ARCHITECTURE USING SOCIAL MEDIA MESSAGE QUEUES

(75) Inventors: Deepak Chandrasekaran, London (GB); Paul Stubbs, Wyboston (GB)

(73) Assignee: NASDAQ, INC., New York, NY (US)

( * ) Notice: Subject to any disclaimer, the term of this patent is extended or adjusted under 35 U.S.C. 154(b) by 0 days.

(21) Appl. No.: 13/465,307

(22) Filed: May 7, 2012

(65) Prior Publication Data

US 2013/0297618 A1 Nov. 7, 2013

(51) Int. Cl.
| | |
|---|---|
| G06F 7/00 | (2006.01) |
| G06F 17/00 | (2006.01) |
| G06Q 50/00 | (2012.01) |
| G06Q 30/02 | (2012.01) |

(52) U.S. Cl.
CPC ............ *G06Q 50/01* (2013.01); *G06Q 30/0201* (2013.01)

(58) Field of Classification Search
CPC ..................................................... G06Q 50/01
See application file for complete search history.

(56) References Cited

U.S. PATENT DOCUMENTS

| | | | |
|---|---|---|---|
| 6,728,707 B1 | 4/2004 | Wakefield et al. | |
| 6,732,097 B1 | 5/2004 | Wakefield et al. | |
| 6,732,098 B1 | 5/2004 | Wakefield et al. | |
| 6,738,765 B1 | 5/2004 | Wakefield et al. | |
| 6,741,988 B1 | 5/2004 | Wakefield et al. | |
| 7,171,349 B1 | 1/2007 | Wakefield et al. | |
| 7,428,528 B1 | 9/2008 | Ferrari et al. | |
| 7,472,427 B2 | 12/2008 | Shimojima et al. | |
| 7,600,017 B2 | 10/2009 | Holtzman et al. | |
| 7,660,783 B2 | 2/2010 | Reed | |
| 7,720,835 B2 | 5/2010 | Ward et al. | |
| 7,792,841 B2 | 9/2010 | McAllister et al. | |
| 7,814,043 B2 | 10/2010 | Uchino | |
| 7,849,048 B2 | 12/2010 | Langseth et al. | |
| 7,865,394 B1 | 1/2011 | Calloway et al. | |
| 7,877,345 B2 | 1/2011 | Nigam et al. | |
| 7,930,302 B2 | 4/2011 | Bandaru et al. | |
| 7,966,241 B2 | 6/2011 | Nosegbe | |
| 7,974,983 B2 | 7/2011 | Goeldi | |
| 7,984,428 B1 | 7/2011 | Seymour | |
| 8,010,524 B2 | 8/2011 | Chen et al. | |
| 8,225,413 B1 * | 7/2012 | De et al. | 726/26 |

(Continued)

FOREIGN PATENT DOCUMENTS

| | | |
|---|---|---|
| EP | 2302533 | 3/2011 |
| GB | 2412196 | 9/2005 |

(Continued)

OTHER PUBLICATIONS

International Search Report for PCT/SE2013/050465 dated Feb. 5, 2014.

(Continued)

*Primary Examiner* — Taelor Kim
(74) *Attorney, Agent, or Firm* — Nixon & Vanderhye, P.C.

(57) ABSTRACT

A social intelligence system is presented that streams information from a source, queues the streamed information, analyzes/scores the queued data, and stores the analyzed/scored data in an analysis database. The analyzed/scored data can then be retrieved from the database for post-processing and stored in a client specific database for further reporting. By streaming the data into various message queues and scoring the data before storing in the analysis database, large volumes of data can be efficiently processed and analyzed for a particular person and/or entity.

19 Claims, 6 Drawing Sheets

(56) References Cited

U.S. PATENT DOCUMENTS

| | | |
|---|---|---|
| 2002/0083039 A1 | 6/2002 | Ferrari et al. |
| 2003/0101166 A1 | 5/2003 | Uchino et al. |
| 2004/0167870 A1 | 8/2004 | Wakefield et al. |
| 2004/0167883 A1 | 8/2004 | Wakefield et al. |
| 2004/0167884 A1 | 8/2004 | Wakefield et al. |
| 2004/0167885 A1 | 8/2004 | Wakefield et al. |
| 2004/0167886 A1 | 8/2004 | Wakefield et al. |
| 2004/0167887 A1 | 8/2004 | Wakefield et al. |
| 2004/0167907 A1 | 8/2004 | Wakefield et al. |
| 2004/0167908 A1 | 8/2004 | Wakefield et al. |
| 2004/0167909 A1 | 8/2004 | Wakefield et al. |
| 2004/0167910 A1 | 8/2004 | Wakefield et al. |
| 2004/0167911 A1 | 8/2004 | Wakefield et al. |
| 2004/0215634 A1 | 10/2004 | Wakefield et al. |
| 2005/0027629 A1 | 2/2005 | De Breed et al. |
| 2005/0038781 A1 | 2/2005 | Ferrari et al. |
| 2005/0108256 A1 | 5/2005 | Wakefield et al. |
| 2006/0053104 A1 | 3/2006 | Ferrari et al. |
| 2006/0242040 A1 | 10/2006 | Rader |
| 2007/0011183 A1 | 1/2007 | Langseth et al. |
| 2007/0083505 A1 | 4/2007 | Ferrari et al. |
| 2007/0100875 A1 | 5/2007 | Chi et al. |
| 2008/0072256 A1 | 3/2008 | Boicey et al. |
| 2008/0134100 A1 | 6/2008 | Ferrari et al. |
| 2008/0154698 A1 | 6/2008 | Flake et al. |
| 2008/0154883 A1 | 6/2008 | Chowdhury et al. |
| 2008/0228695 A1 | 9/2008 | Sifry et al. |
| 2008/0256093 A1* | 10/2008 | Amitay et al. ................ 707/100 |
| 2009/0106697 A1* | 4/2009 | Ward et al. ................... 715/835 |
| 2009/0119156 A1 | 5/2009 | Dulepet |
| 2009/0119157 A1 | 5/2009 | Dulepet |
| 2009/0119173 A1 | 5/2009 | Parsons et al. |
| 2009/0125482 A1 | 5/2009 | Peregrine et al. |
| 2009/0164266 A1 | 6/2009 | Lakhani et al. |
| 2009/0319342 A1* | 12/2009 | Shilman et al. ................ 705/10 |
| 2009/0319518 A1 | 12/2009 | Koudas et al. |
| 2010/0049590 A1 | 2/2010 | Anshul |
| 2010/0070485 A1 | 3/2010 | Parsons et al. |
| 2010/0082695 A1 | 4/2010 | Hardt |
| 2010/0088313 A1* | 4/2010 | Hoffman et al. ............. 707/733 |
| 2010/0114899 A1 | 5/2010 | Guha et al. |
| 2010/0119053 A1 | 5/2010 | Goeldi |
| 2010/0121707 A1 | 5/2010 | Goeldi |
| 2010/0169159 A1 | 7/2010 | Rose et al. |
| 2010/0241620 A1* | 9/2010 | Manister et al. ............. 707/709 |
| 2010/0275123 A1 | 10/2010 | Yu et al. |
| 2010/0287136 A1 | 11/2010 | Fortuna, Jr. et al. |
| 2010/0325107 A1 | 12/2010 | Kenton et al. |
| 2010/0332465 A1 | 12/2010 | Janssens et al. |
| 2011/0029926 A1 | 2/2011 | Hao et al. |
| 2011/0047035 A1 | 2/2011 | Gidwani et al. |
| 2011/0078157 A1 | 3/2011 | Sun et al. |
| 2011/0078584 A1 | 3/2011 | Winterstein et al. |
| 2011/0106589 A1 | 5/2011 | Blomberg et al. |
| 2011/0106807 A1* | 5/2011 | Srihari et al. ................ 707/739 |
| 2011/0144971 A1 | 6/2011 | Danielson |
| 2011/0145219 A1* | 6/2011 | Cierniak et al. ............. 707/709 |
| 2011/0191372 A1 | 8/2011 | Kaushansky et al. |
| 2011/0246463 A1 | 10/2011 | Carson, Jr. et al. |
| 2011/0282860 A1* | 11/2011 | Baarman et al. ............. 707/709 |
| 2012/0047219 A1 | 2/2012 | Feng et al. |
| 2012/0254333 A1* | 10/2012 | Chandramouli et al. ..... 709/206 |
| 2013/0006685 A1* | 1/2013 | Kelkar et al. ................ 705/7.11 |
| 2013/0073480 A1* | 3/2013 | Sastri et al. ................. 705/36 R |
| 2013/0103667 A1* | 4/2013 | Minh ............................ 707/709 |
| 2013/0110583 A1* | 5/2013 | Ormont et al. .............. 705/7.29 |
| 2013/0138428 A1* | 5/2013 | Chandramouli et al. ......... 704/9 |

FOREIGN PATENT DOCUMENTS

| | | |
|---|---|---|
| HK | 1072114 | 11/2009 |
| WO | WO0139065 | 5/2001 |
| WO | WO0246997 | 6/2002 |
| WO | WO02097671 | 12/2002 |
| WO | WO03027901 | 4/2003 |
| WO | WO03027902 | 4/2003 |
| WO | WO03054746 | 7/2003 |
| WO | WO2004053645 | 6/2004 |
| WO | WO2005026992 | 3/2005 |
| WO | WO2005076175 | 8/2005 |
| WO | WO2006039566 | 4/2006 |
| WO | WO 2007/002839 | 1/2007 |
| WO | WO2007015990 | 2/2007 |
| WO | WO2007058863 | 5/2007 |
| WO | WO2007101263 | 9/2007 |
| WO | WO2008039542 | 4/2008 |
| WO | WO2008067554 | 6/2008 |
| WO | WO2009003050 | 12/2008 |
| WO | WO2009023865 | 2/2009 |
| WO | WO2009105277 | 8/2009 |
| WO | WO2009155375 | 12/2009 |
| WO | WO2010065199 | 6/2010 |

OTHER PUBLICATIONS

Written Opinion of the International Searching Authority for PCT/SE2013/050465 dated Feb. 5, 2014.

Bifet et al., "MOA-TweetReader: Real-Time Analysis in Twitter Streaming Data" Discovery Science, Springer Berlin Heidelberg, 2011, vol. 6926, pp. 46-60.

* cited by examiner

SOCIAL INTELLIGENCE ARCHITECTURE USING SOCIAL MEDIA MESSAGE QUEUES

BACKGROUND

Information may be conveyed through a variety of mediums. For decades, printed media such as newspapers and/or magazines were used to convey information to a multitude of people. Now, the Internet makes it possible to convey information through many forms of electronic media.

Web-sites are a common way to convey information over the Internet. Additional forms of electronically conveying information have developed and taken off in the past few years. Blogs and social media/networking web-sites allow users less proficient with computers to log-on and convey their opinion about people, companies, products, or anything that may be of interest.

As easily as information can be transmitted over the Internet, the very same information can be monitored and analyzed. Sentiment analysis technology analyzes information presented in both electronic and non-electronic media in order to help determine a particular viewpoint or opinion about a particular topic.

For example, an individual may log on to Facebook® and post a message about how much they like a new product. Sentiment analysis technology can retrieve and store the user's post and determine that the user's sentiment towards the new product is positive.

Current sentiment analysis technology typically acquires mass volumes of social media data and stores the data in a relational database. The data can later be retrieved for sentiment analysis, and individuals and/or corporations can determine the overall sentiment about a topic based on the collected and analyzed data.

Unfortunately, these systems do not efficiently process the mass volumes of data that must be collected and organized in a relational database before sentiment analysis can be performed and before the data can be customized for a particular person and/or entity. Thus, there is a need for a system that quickly and efficiently analyzes large volumes of social media data for sentiment and stores it in a database for post-analysis by a particular individual and/or entity.

BRIEF SUMMARY

A social intelligence system is presented that streams information from a source, queues the streamed information, analyzes/scores the queued data, and stores the analyzed/scored data in an analysis database. The analyzed/scored data can then be retrieved from the database for post-processing and stored in a client specific database for further reporting. By streaming the data into various message queues and scoring the data before storing in the analysis database, large volumes of data can be efficiently processed and analyzed for a particular person and/or entity.

A method for analyzing social media data in an information processing apparatus having one or more processors includes receiving, using a data transmission device, social media data streams from one or more social media sources as social media data segments. The method further comprises queuing the received social media data segments into one or more social media message queues, the one or more social media message queues buffering the social media data segments as the segments are streamed from the one or more social media sources, scoring the buffered social media data segments based upon one or more predefined factors, performing, using the one or more processors, a sentiment analysis for an entity using the social media data segments and a score associated with the social media data segments, and storing the social media data segments and their associated score of the data segment into an analysis database.

A non-transitory computer-readable storage medium having computer-readable code embodied therein which, when executed by a computer having one or more processors, performs the method for analyzing social media data according to the preceding paragraph.

Another aspect of the technology relates to a social intelligence apparatus that includes a memory having one or more social media message queues and one or more processors, coupled to the memory, configured to execute social media data analysis in the social intelligence apparatus. The one or more processors are also configured to receive, using a data transmission device, social media data streams from one or more social media sources as social media data segments, queue the received social media data segments into one or more social media message queues, the one or more social media message queues buffering the social media data segments as the segments are streamed from the one or more social media sources, score the buffered social media data segments based upon one or more predefined factors, perform, using the one or more processors, a sentiment analysis for an entity using the social media data segments and a score associated with the social media data segments, and store the social media data segments and their associated score of the data segment into an analysis database.

Another aspect of the technology relates to a social intelligence system that includes one or more social media devices and a social intelligence apparatus. The one or more social media devices have a memory configured to store social media data, one or more processors configured to process social media data, and a transceiver configured to transmit social media data. The social intelligence apparatus has a memory having multiple social media message queues, a transceiver configured to receive social media data from the one or more social media devices, and one or more processors, coupled to the memory, and configured to execute social media data analysis in the social intelligence apparatus. The one or more processors are also configured to receive, using a data transmission device, social media data streams from one or more social media sources as social media data segments, queue the received social media data segments into one or more social media message queues, the one or more social media message queues buffering the social media data segments as the segments are streamed from the one or more social media sources, score the buffered social media data segments based upon one or more predefined factors, perform, using the one or more processors, a sentiment analysis for an entity using the social media data segments and a score associated with the social media data segments, and store the social media data segments and their associated score of the data segment into an analysis database.

In a non-limiting, example implementation the social media data segments are parsed and scored using a natural language processor, and the results of the sentiment analysis are stored in an entity specific database.

In another non-limiting, example implementation the social media data segments are analyzed for a positive, neutral, or negative sentiment of an author of the social media data segment.

In yet another non-limiting, example implementation the multiple social media sources comprises at least one of publications, social media websites, forums, blogs, radio broadcasts, and/or television broadcasts.

In another non-limiting, example implementation social media data segments and their associated scores are stored in a historical database from the analysis database after a predetermined period of time.

In yet another non-limiting, example implementation the one or more social media message queues comprise high speed memory capable of quickly buffering and accessing the social media data segments.

In another non-limiting, example implementation a sentiment report is generated based on the performed sentiment analysis for the entity.

DETAILED DESCRIPTION OF THE TECHNOLOGY

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions. Although databases may be depicted as tables below, other formats (including relational databases, object-based models, and/or distributed databases) may be used to store and manipulate data.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Various forms of computer readable media/transmissions may be involved in carrying data (e.g., sequences of instructions) to a processor. For example, data may be (i) delivered from RAM to a processor; (ii) carried over any type of transmission medium (e.g., wire, wireless, optical, etc.); (iii) formatted and/or transmitted according to numerous formats, standards or protocols, such as Ethernet (or IEEE 802.3), SAP, ATP, BLUETOOTH, and TCP/IP, TDMA, CDMA, 3G, etc.; and/or (iv) encrypted to ensure privacy or prevent fraud in any of a variety of ways well known in the art.

Social media and traditional media (e.g., print media, online media, broadcast media) are very useful for corporate marketing purposes. The technology described below relates to monitoring, analyzing, and evaluating media data, including social media data.

In an example implementation, unfiltered and pre-filtered data can be pulled from external sources through Simple Object Access Protocol (SOAP) XML requests, for example. It should be appreciated that pre-filtered data can relate to the apparatus avoiding unnecessary volumes of irrelevant social media data from sources through the application of specified keywords and/or phrases or through the application of terms to be excluded. Thus, only materials that pass pre-filtering will be passed through as data that can be pulled from external sources.

The feed data is stored in message queues where scheduling services can retrieve the data from the message queues. Upon retrieving the queued data, the data is parsed and analyzed using a Natural Language Processor (NLP), where the analyzer can pick up positive, negative, or neutral sentiment from the analyzed data. Based on the sentiment, a sentiment score can be assigned and associated with the data. The analyzed data along with its associated score can then be stored in a database.

As explained below, using message queues to process large volumes of social media data (e.g., Twitter®, Facebook®) allows for the automated analysis of large volumes in near real time. Data can be processed within minutes of its availability from a service feed provider and made available for a client of the system to include in the client's analysis.

The technology described herein enables the processing of vast volumes of social media data with sentiment analysis to determine tonality within a piece of social media data. For example, data can be scored with integer values or real, non-integer values (e.g., between 0.02 and any positive integer (+1)) where the value of 0 is normally reserved for NULL instances. The tonality (e.g., aggregation of sentiments from data) can include at least one of a negative, neutral, and/or positive sentiment and also a factual and/or NULL sentiment. These sentiments can be assigned the following values: positive sentiment=+N, neutral sentiment=0.02N, negative sentiment=−N, factual sentiment=99N, and NULL=0. The apparatus can assign a tonality value associated with the sum of sentiment assigned to each word in the data and the value can be in a range from any negative integer (e.g., −1) to any positive integer (e.g., +1) where 0 can be reserved for NULL occurrences.

The technology allows for processing large volumes of social media data from various sources without the need to store the data first in a relational database (or some form of computer-readable storage media) prior to automatically analyzing the social media data for sentiment and providing tonality scoring. This allows for very fast and dynamic handling of large data volumes to modify the services required to handle the volume.

In addition, the technology enables for the rapid analysis of the social media data providing near real time analysis and reporting of social media events as they occur. The technology also provides resilience by using multiple configurations of servers and services, the number of which is determined by the volume of social media data arriving in a particular system.

Figure 1:
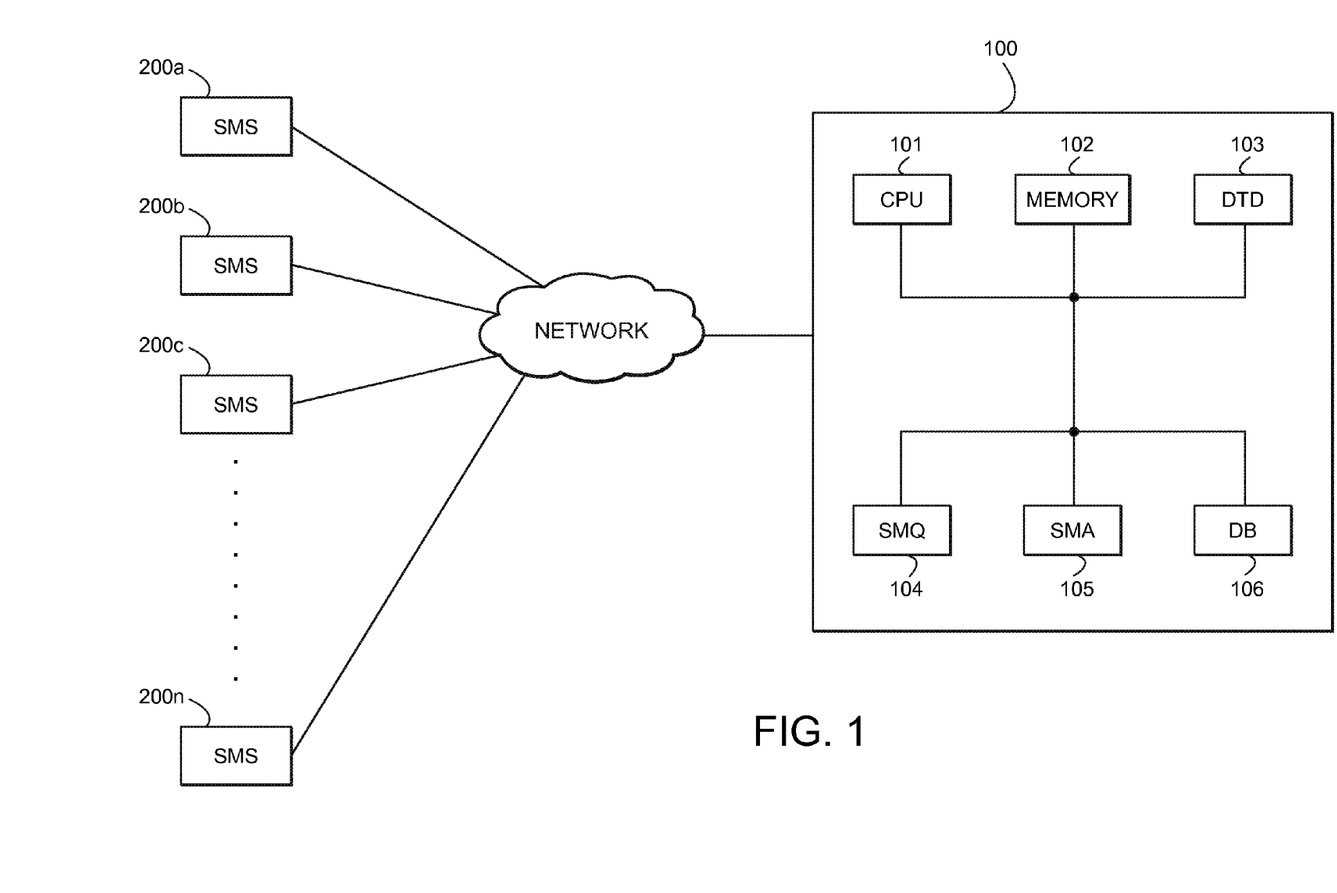
FIG. 1 depicts a block diagram of an example embodiment of a social intelligence apparatus.

FIG. 1 shows a non-limiting, example embodiment of a block diagram of a social intelligence apparatus. In FIG. 1, a social intelligence apparatus 100 receives streamed social media data from social media streams 200a-200n over a network. The social media streams 200a-200n can come from a variety of sources. For example, social media streams 200a-n can be streamed from social media web-sites, such as Twitter®, Facebook®, or LinkedIn®. The social media streams 200a-n can also come from blog entries or web-sites. The data provided by the streams 200a-n is not limited to web-sites and can be data transmitted from media outlets, such as publishers and/or news companies (e.g., Fox®, CNN®).

The streams can be any continuously broadcast/Internet channel for social media whereby items are continually added in an unrestricted manner (e.g., there are no cyclical start and endpoints). The data includes but is also not limited to data that is traditionally submitted electronically and can include print data, such as a magazine or newspaper, for example. Of course, one skilled in the art appreciates that in an example embodiment, the print data is converted to an electronic form and transmitted as text data via the social media streams 200a-n. The social media streams 200a-n are provided by one or more information processing devices capable of transmitting data to the social intelligence apparatus 100.

The social intelligence apparatus 100 can be configured to have at least one CPU 101, at least one memory 102, and at least one data transceiver device (DTD) 103. The social intelligence apparatus 100 is also configured to have one or more social media data queues (SMQ) 104, at least one social media data analyzer (SMA) 105, and at least one database (DB) 106 configured to store analyzed social media data. In an example embodiment, the social media data streamed from the streams 200a-n is processed by the social intelligence apparatus 100 using the queues 104, analyzed and scored using the analyzer 105, and then stored in the database 106 after. The data streamed from the social media data streams 200a-n can be received by the social intelligence apparatus 100 using the DTD 103.

Figure 2:
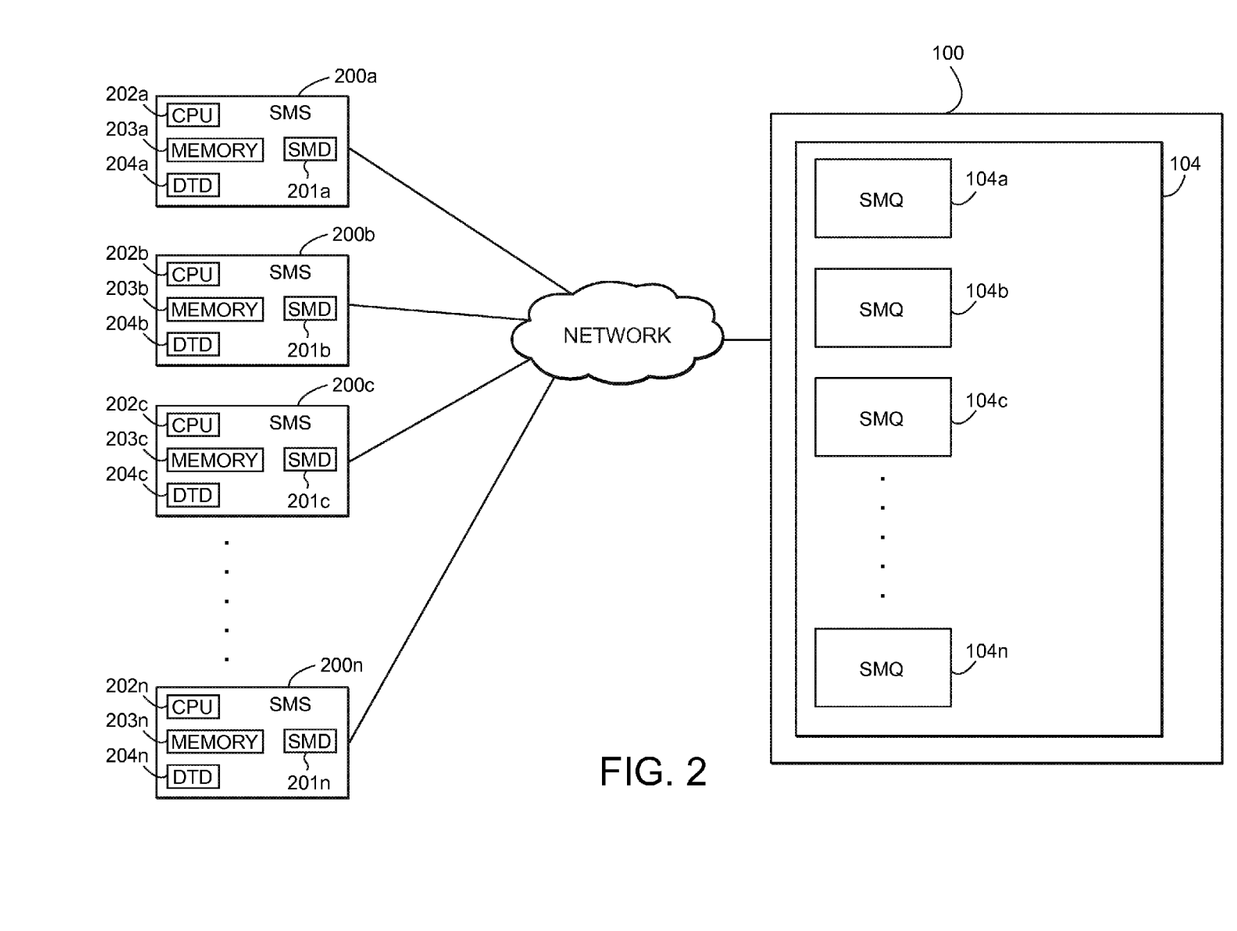
FIG. 2 is a block diagram of an example embodiment showing further detail of the social intelligence apparatus.

FIG. 2 shows a non-limiting, example embodiment of a block diagram showing further detail of the social intelligence apparatus 100 communicating with the social media data streams 200a-n. As can be seen in FIG. 2, the streams 200a-n have respective social media data 201a-n. The social media data 201a-n can be any form of information, but in an example embodiment, is normally data taken from different social media sources. For example, the social media data 201a may be various posts on Facebook®, the social media data 201b may be various posts on Twitter®, and the social media data 201c may be articles taken from the New York Times®.

As the data is streamed in from the streams 200a-n, the social intelligence apparatus 100 queues the data using the social media data queues 104a-n. Although FIG. 2 shows queues 104a-n corresponding to the streams 200a-n, the queues 104a-n may receive and queue data from any of the streams 200a-n.

Each SMS 200a-n can be configured to have a CPU 202a-n, memory 203a-n, and DTD 204a-n. It should be appreciated that social media data 201a-n can be stored in the memory 203a-n of each respective SMS 200a-n and social media data 201a-n can be transmitted to one or more social intelligence apparatus 100 using DTDs 204a-n.

In an example embodiment, social media data 201a may contain data streams originating from user posts on Facebook®. For example, in a given period of time (e.g., 1 hour), Facebook® may generate over 100,000 user posts. These posts can be streamed from Facebook® from social media data stream 200a over the network, where the apparatus 100 receives the data and begins storing the data in the social media queues 104a-n. This architecture advantageously enables the apparatus 100 to process and analyze large volumes of data over the network without having to first store the data in a relational database.

Figure 3:
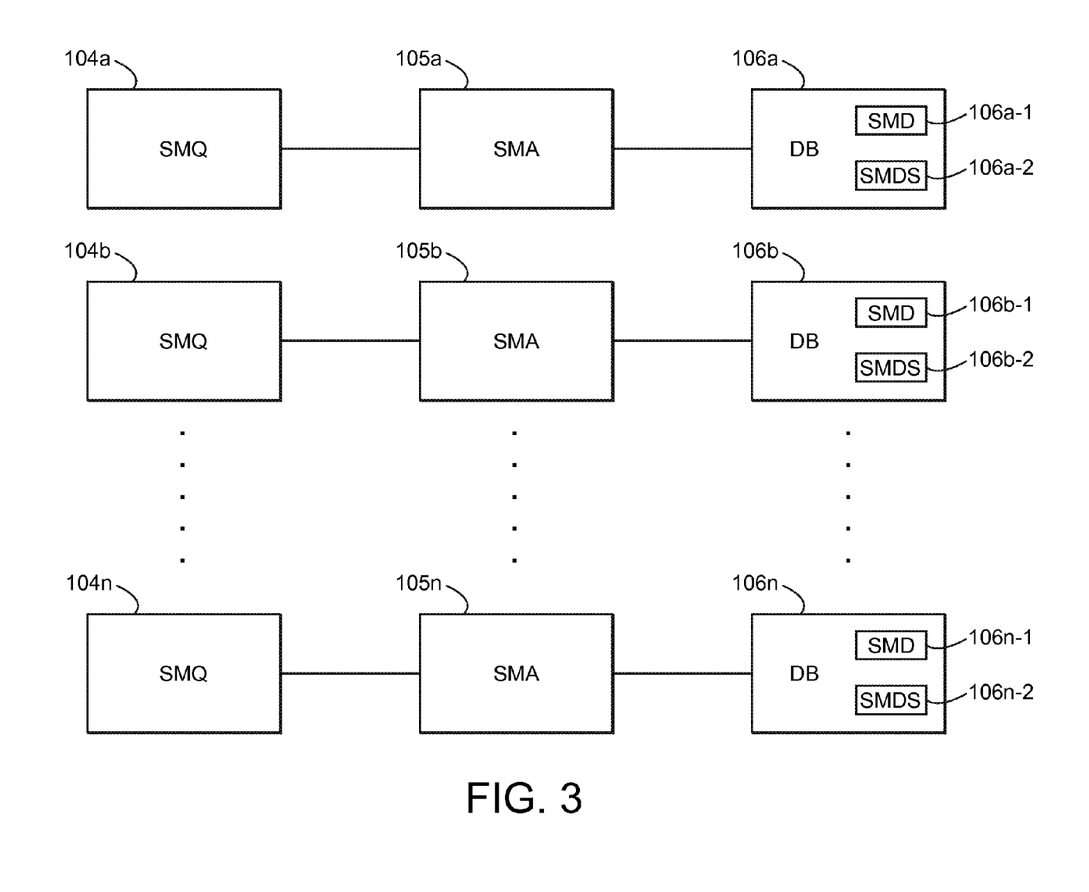
FIG. 3 is a block diagram of an example embodiment of the relationship between the components of the social intelligence apparatus.

FIG. 3 shows a block diagram of a non-limiting, example embodiment of the relationship between the components of the apparatus 100. In an example embodiment, data is processed from the social media data queues 104a-n via the social media data analyzers 105a-n. The social media data analyzers 105a-n analyze the social media data for sentiment and provide a score for each data segment. For example, an individual may write a post on Facebook® about how much he/she likes the design of a new product. The data from the post is queued in the social media queue 104a and submitted to analyzer 105a. As the sentiment for the post is generally positive, the analyzer 105a will give it a positive score.

The score may be a numerical value (e.g., a positive number for a positive sentiment, zero for neutral sentiment, and a negative number for negative sentiment) or could even be a description such as "positive," "neutral," or "negative." In this example, the sentiment may be scored from a different viewpoint (e.g., from the viewpoint of a competitor) and as such, may be a negative score as opposed to a positive score. That is, a competitor to the company that designed the above-mentioned new product may not benefit from positive sentiment about the new product, so the analyzer 105a may instead score the data as negative instead of positive.

Once the analyzers 105a-n analyze a particular piece of data, the data is then moved into databases 106a-n. Databases 106a-n may be separate databases for storing scored data or a single database storing the entire scored data. The databases 106a-n store both the social media data 106a-1-106n-1 and the respective social media data score 106a-2-106n-2 for each social media data 106a-1-106-n-1. By providing a pipeline for queuing, scoring, and then storing the data, the system can process and analyze very large volumes of streamed data prior to the data being stored in a relational database.

Figure 4:
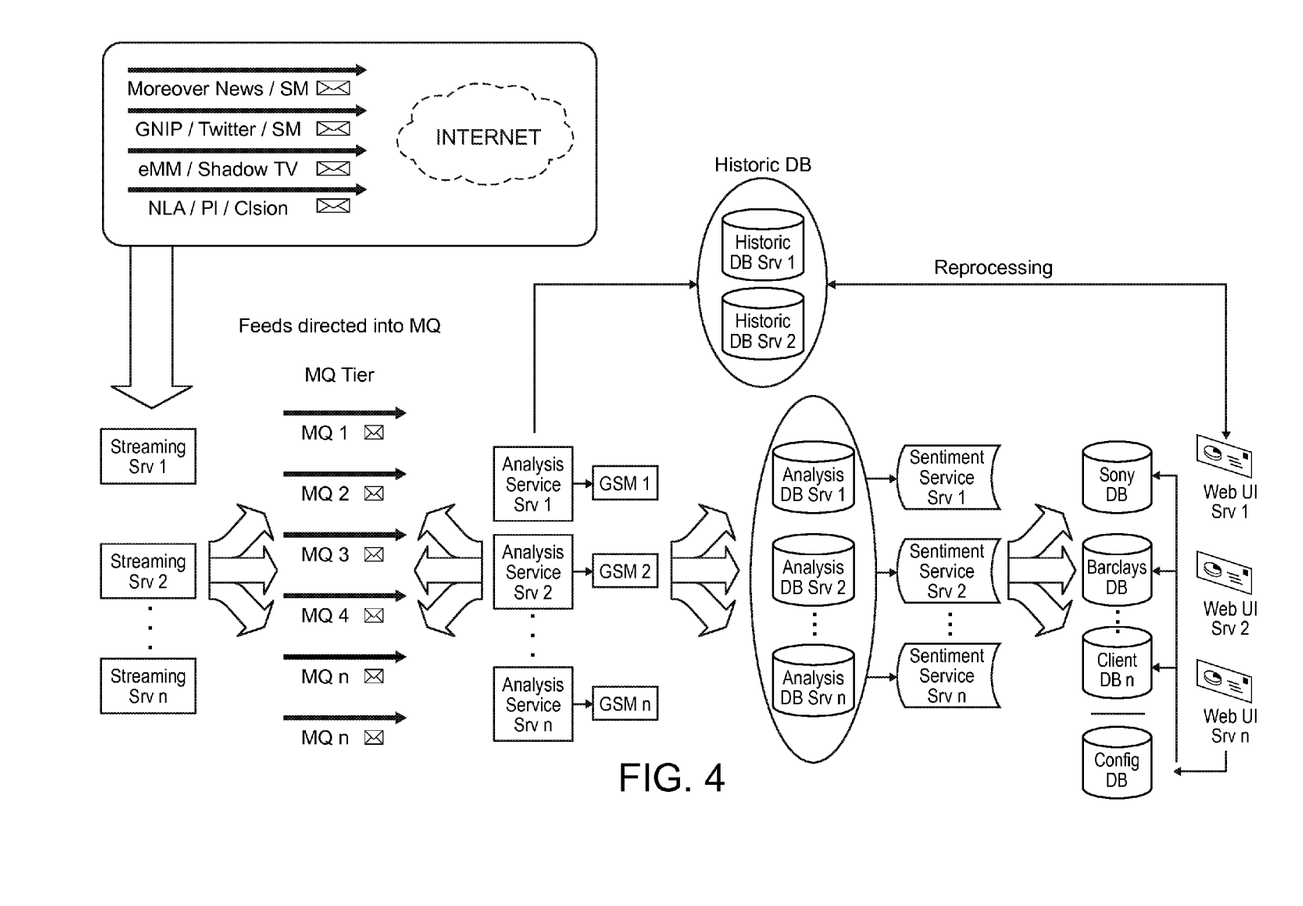
FIG. 4 is a diagram of an example embodiment of a social intelligence system.

FIG. 4 shows a diagram of a non-limiting, example embodiment of a social intelligence system. FIG. 4 depicts a pipeline approach to processing data streamed from various sources. As can be seen in FIG. 4, data is streamed over the Internet from various media sources, including, but not limited to, Moreover News, Twitter, and Shadow TV. The data is streamed into Streaming Services Srv1-n where streaming servers can pull data from the different sources.

The Streaming Services Srv1-n stream the data to Message Queues MSMQ1-n. The data can then be retrieved from Message Queues MSMQ1-n by Analysis Services Srv1-n. As mentioned above, Analysis Services Srv1-n will analyze data retrieved from Queues MSMQ1-n for sentiment and score the particular data (e.g., via a general social media analyzer).

After the data is analyzed, it can be moved into Analysis Databases DB Srv1-*n*. As also mentioned above, the Databases DB Srv1-*n* can store both the data and its associated score.

After Analysis Services Srv1-*n* analyze the data, the data can instead be stored in Historic Databases DB Srv1-*n*. As described in further detail below, certain data may not be particularly relevant for storage in the Analysis Databases DB Srv1-*n* and instead can be analyzed and scored and stored in a separate Historic Database DB Srv1-*n*. For example, data may be created prior to a certain date or may be stale (e.g., a user commenting on Facebook® about a video game system no longer in the marketplace). This data can still be analyzed and scored but instead stored in the Historic Databases DB Srv1-*n*.

Upon storing the data in the Analysis Databases DB Srv1-*n*, the data can be stored in Client Specific Databases DB1-*n* using Sentiment Services Srv1-*n*. Along with the Client Specific Databases DB1-*n* is a separate Configuration Database Cfg DB where different client specific databases can be configured. It should be appreciated that a sentiment controller can pull the data from an analysis database to determine the relevance of the data to a client of the system. The sentiment controller will then move the data to the client database. The Configuration Database Cfg DB can then create/modify client database configurations that can determine, for example, when a user logs onto the system and/or which database they have access.

The system can also provide a User Interface UI Srv1-*n* where a user can customize how information is presented to them. It should be appreciated that the interface may be a web-based interface or can even be a desktop client interface. The User Interface Srv1-*n* are configured to allow a user to see, for example, a particular sentiment on a topic. For example, marketing personnel at a company may be interested in finding out what people and/or media sources are saying about the company's products. The user can access the interface and a report will be provided to the user showing the overall sentiment for the company's products.

For example, users on Facebook® and Twitter® may be posting positive comments about games and features for the company's products and the report will indicate the overall positive sentiment to the user using the User Interface UI Srv1-*n*. It should also be appreciate that a user may direct various information to the Historic Databases DB Srv1-*n* if the user deems that certain information may not be particularly relevant to the user. Using the example above, the user may receive information regarding the very first company product and may not want that information for sentiment analysis. Thus, the user can direct such information to the Historic Databases DB Srv1-*n* so it may be retained but not used in the report.

Figure 5:
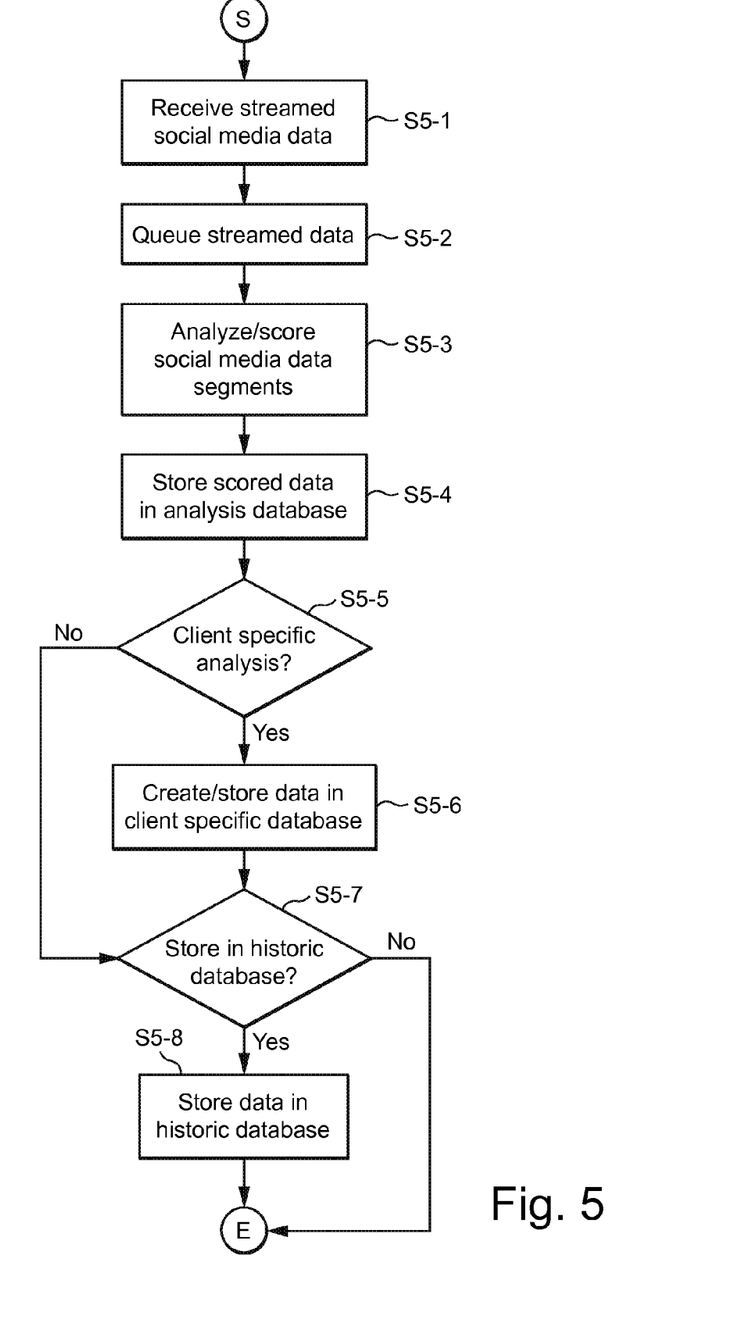
FIG. 5 is an application flowchart of an example embodiment of a flow of processes that can be implemented by the social intelligence apparatus.

FIG. 5 depicts an application flowchart of a non-limiting, example embodiment of a flow of processes that can be implemented by the social intelligence apparatus 100. The process begins in S5-1 where social media data is streamed from one or more social media data sources. As described above, the social media data may come from various sources such as Facebook®, web-site blogs, or even newspapers and magazines.

Upon receiving the streamed social media data, the streamed data is queued into one or more data queues (S5-2). As explained above, the queues are capable of queuing the streamed social media data and can handle large volumes of data. After the data is stored in the one or more data queues the data can be retrieved from the queues and analyzed/scored based on a particular sentiment of the data (S5-3).

After the data is analyzed/scored for a particular sentiment, the data and its associated score can be stored in one or more analysis databases (S5-4). From there, it can be determined if the data should be used for a client specific analysis (S5-5). If so, a separate client specific database can be created where the stored and analyzed data can be separately stored (S5-6). If a database already exists for a particular client, the data can be added to the particular database. If the data is not meant to be stored in a client specific database, it can then be determined if the data should be stored in the historic databases (S5-7). If so, the data can be moved from the client specific database or moved from the analysis database to the historic database (S5-8). Examples of criteria for determining if data should be stored in the historic database are discussed with respect to FIG. 6.

Figure 6:
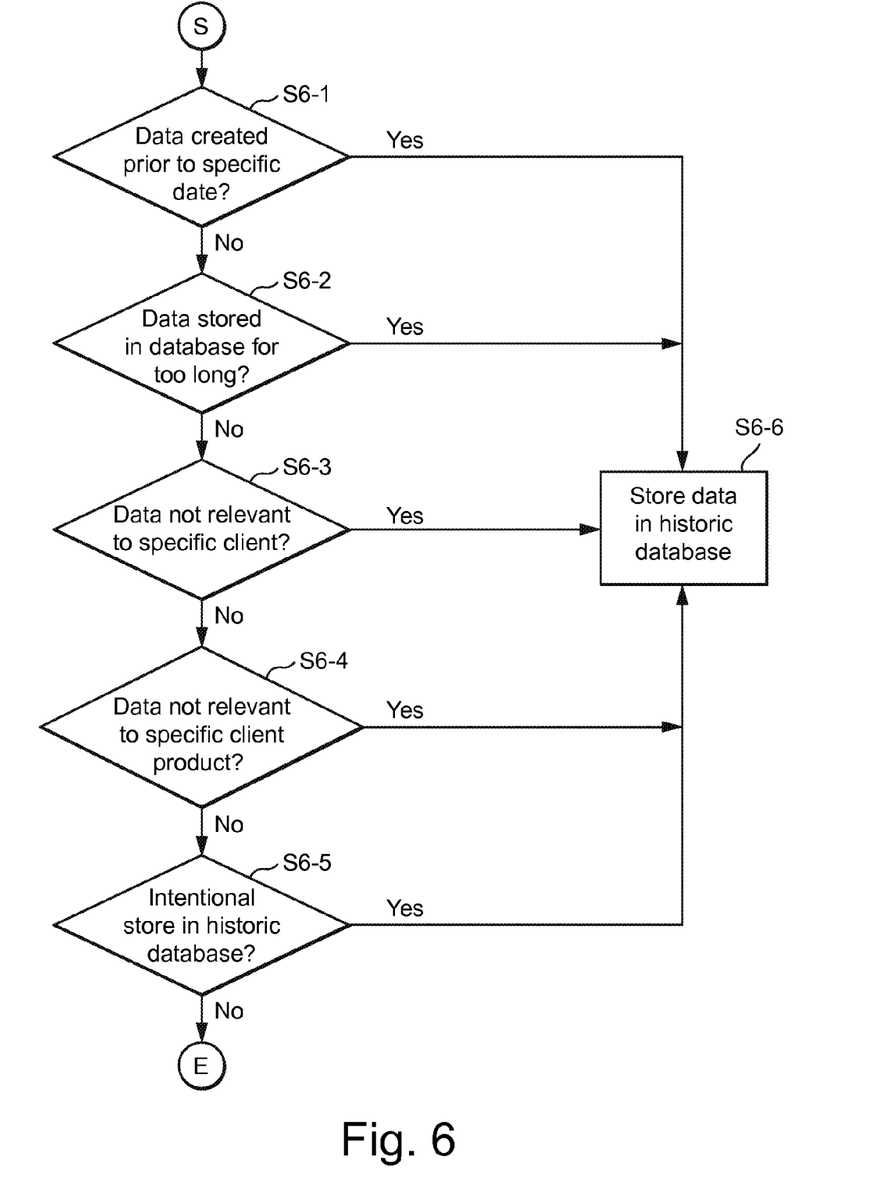
FIG. 6 is an application flowchart of an example embodiment of a flow of processes for determining whether certain data should be stored in the historic databases.

FIG. 6 shows an application flowchart of a non-limiting, example embodiment of a flow of processes for determining whether certain data should be stored in the historic databases. In one example, the data may be generated/streamed where the origin of the data may be prior to a specific date (S6-1). For example, the streamed data may contain an old blog generated several years ago and may not be as relevant for analysis. If so, the data can be moved and stored in the historic database (S6-6).

In another example, the data may be stored in the analysis database for a duration of time that is considered too long (S6-2). For example, the analysis database may contain data analyzed from a Facebook® post that has been in the analysis database for over 6 months. Of course, 6 months is just an example and the system can be configured to move data that has been in the database for longer or shorter periods of time. If it is determined that the data is in the database for too long, the data can be moved and stored in the historic database (S6-6).

In another example, data not relevant to a particular client may be stored in the historic database (S6-3). For example, a Facebook® post just generally describing sentiment about a particular technology (e.g., "I hate cell phones") though describing a negative sentiment, may not be relevant to any particular client. Thus, such data may also be stored in the historic database (S6-6).

In yet another example, the data may be relevant to a particular client but not relevant to any products of interest (S6-4). For example, a blog entry may describe how much the author likes a particular company. Although the sentiment is generally positive, without more, there is nothing to link the blog entry to one or more products for the particular company. Thus, such data may be advantageous for the company's purposes but not necessary for any particular analysis and can be stored in the historic database (S6-6).

In yet another example, a user may simply intentionally store particular data in the historic database (S6-5). As discussed above, the user may see the relevant data via a user interface and may determine that certain data is not relevant for analysis thus intentionally moving such data to the historic database (S6-6).

As mentioned above, the technology described in this application takes large volumes of social media data in real-time (or near real-time) from a social media source (e.g., through the Internet and/or social streams). The data is placed into message queues for handling large volumes of data in a fast and efficient manner to continue to provide near real-time data collection and resilience to failure. The data can then be sentiment analyzed using NLP technology direct from the message queues while maintaining performance and near real-time processing. The data can then be stored in an analysis database for post-processing and that data can be pulled from the database using sentiment controllers to determine the relevance to a particular client. From there, the data can be stored for the particular client in the system to ensure they only obtain relevant data and a user interface can then allow the client to perform their own analysis on the data stored in the client specific database.

While the technology has been described in connection with example embodiments, it is to be understood that the technology is not to be limited to the disclosed embodiments. On the contrary, the technology covers various modifications and equivalent arrangements included within the spirit and scope of the appended claims.

The invention claimed is:

1. A method for analyzing social media data, comprising:
at an information processing apparatus having at least one or more processors and a transceiver:
receiving, using the transceiver, social media data streams from one or more social media sources as social media data segments, wherein the social media data segments include social media data segments related to the entity;
queuing, using the one or more processors, the received social media data segments into one or more social media message queues, the one or more social media message queues queuing the social media data segments as the segments are streamed from the one or more social media sources;
assigning, using the one or more processors, a score and a polarity for each of the queued social media data segments from a viewpoint of the entity for which the sentiment analysis is being performed, the score and polarity for each social media data segment including at least one of a positive, neutral, or negative sentiment determined based on the viewpoint of the entity for which the sentiment analysis is being performed;
generating, using the one or more processors, a resultant sentiment based on the score and the polarity assigned to the queued social media data segments; and
storing, using the one or more processors, the social media data segments and their associated resultant sentiment into an analysis database specific to the entity.

2. The method for analyzing social media data according to claim 1, further comprising:
parsing and scoring the social media data segments using a natural language processor.

3. The method for analyzing social media data according to claim 1, wherein the multiple social media sources comprises at least one of publications, social media websites, forums, blogs, radio broadcasts, and/or television broadcasts.

4. The method for analyzing social media data according to claim 1, further comprising moving the social media data segments and their associated resultant sentiment from the analysis database into a historical database after a predetermined period of time.

5. The method for analyzing social media data according to claim 1, further comprising generating a sentiment report based on the resultant sentiment.

6. A non-transitory computer-readable storage medium comprising computer readable code embodied therein which, when executed by a computer having one or more processors, causes the computer to:
receive social media data streams from one or more social media sources as social media data segments, wherein the social media data segments include social media data segments related to the entity;
queue the received social media data segments into one or more social media message queues, the one or more social media message queues queuing the social media data segments as the segments are streamed from the one or more social media sources;
assign a score and a polarity for each of the queued social media data segments from a viewpoint of the entity for which the sentiment analysis is being performed, the score and polarity for each social media data segment including at least one of a positive, neutral, or negative sentiment determined based on the viewpoint of the entity for which the sentiment analysis is being performed;
generate a resultant sentiment based on the score and the polarity assigned to the queued social media data segments; and
store the social media data segments and their associated resultant sentiment into an analysis database specific to the entity.

7. A social intelligence apparatus, comprising:
a transceiver;
a memory having one or more social media message queues; and
one or more processors, coupled to the memory, configured to execute social media data analysis in the social intelligence apparatus and configured to:
receive, using the transceiver, social media data streams from one or more social media sources as social media data segments, wherein the social media data segments include social media data segments related to an entity,
queue the received social media data segments into one or more social media message queues, the one or more social media message queues queuing the social media data segments as the segments are streamed from the one or more social media sources,
assign a score and a polarity for each of the queued social media data segments from a viewpoint of the entity for which the sentiment analysis is being performed, the score and polarity for each social media data segment including at least one of a positive, neutral, or negative sentiment determined based on the viewpoint of the entity for which the sentiment analysis is being performed,
generate a resultant sentiment based on the score and the polarity assigned to the queued social media data segments, and
store the social media data segments and their associated resultant sentiment into an analysis database specific to the entity.

8. The social intelligence apparatus according to claim 7, wherein the one or more processors are further configured to:
parse and score the social media data segments using a natural language processor.

9. The social intelligence apparatus according to claim 7, wherein the multiple social media sources comprises at least one of publications, social media websites, forums, blogs, radio broadcasts, and/or television broadcasts.

10. The social intelligence apparatus according to claim 7, wherein the one or more processors are further configured to move the social media data segments and their associated resultant sentiment from the analysis database into a historical database after a predetermined period of time.

11. The social intelligence apparatus according to claim 7, wherein the one or more processors are further configured to generate a sentiment report based on the resultant sentiment.

12. A social intelligence system, comprising:
one or more social media devices having:
- a memory configured to store social media data,
- one or more processors configured to process social media data, and
- a transceiver configured to transmit social media data; and a social intelligence apparatus having:
- a memory having multiple social media message queues,
- a transceiver configured to receive social media data from the one or more social media devices, and
- one or more processors, coupled to the memory, configured to execute social media data analysis in the social intelligence apparatus and configured to:
  - receive, using the transceiver, social media data streams from one or more social media sources as social media data segments, wherein the social media data segments include social media data segments related to an entity,
  - queue the received social media data segments into one or more social media message queues, the one or more social media message queues queuing the social media data segments as the segments are streamed from the one or more social media sources,
  - assign a score and a polarity for each of the queued social media data segments from a viewpoint of the entity for which the sentiment analysis is being performed, the score and polarity for each social media data segment including at least one of a positive, neutral, or negative sentiment determined based on the viewpoint of the entity for which the sentiment analysis is being performed,
  - generate a resultant sentiment based on the score and the polarity assigned to the queued social media data segments, and
  - store the social media data segments and their associated resultant sentiment into an analysis database specific to the entity.

13. The social intelligence system of claim 12, wherein the one or more processors are further configured to:
parse and score the social media data segments using a natural language processor.

14. The social intelligence system of claim 12, wherein the multiple social media sources comprises at least one of publications, social media websites, forums, blogs, radio broadcasts, and/or television broadcasts.

15. The social intelligence system of claim 12, wherein the one or more processors in the social intelligence apparatus are further configured to move the social media data segments and their associated resultant sentiment from the analysis database into a historical database after a predetermined period of time.

16. The method for analyzing social media data according to claim 1, wherein the entity is a client and the resultant sentiment for the queued social media data segments vary depending upon the client.

17. The method for analyzing social media data according to claim 1, wherein the score and polarity varies depending upon content in the social media data segment with respect to the viewpoint of the entity.

18. The method for analyzing social media data according to claim 1, wherein a score and polarity normally indicating negative sentiment indicates positive sentiment when content in the social media data segment relates to a competitor of the entity.

19. The method for analyzing social media data according to claim 1, wherein a score and polarity normally indicating positive sentiment indicates negative sentiment when content in the social media data segment relates to a competitor of the entity.

* * * * *